United States Patent [19]

Langsam et al.

[11] Patent Number: 4,952,220

[45] Date of Patent: Aug. 28, 1990

[54] MEMBRANES FORMED FROM UNSATURATED POLYIMIDES

[75] Inventors: Michael Langsam, Allentown; William F. Burgoyne, Jr.; Jeremiah P. Casey, both of Emmaus; Michael E. Ford, Coopersburg, all of Pa.

[73] Assignee: Air Products and Chemicals, Inc., Allentown, Pa.

[21] Appl. No.: 420,087

[22] Filed: Oct. 11, 1989

Related U.S. Application Data

[63] Continuation-in-part of Ser. No. 336,383, Apr. 11, 1989, abandoned.

[51] Int. Cl.$^5$ .................. B01D 53/22; B01D 71/64
[52] U.S. Cl. .......................... 55/158; 55/16; 210/500.39
[58] Field of Search .................. 55/16, 68, 158; 210/500.39

[56] References Cited

U.S. PATENT DOCUMENTS

| Re. 30,351 | 7/1980 | Hoehn et al. | 55/16 |
| 3,822,202 | 7/1974 | Hoehn | 55/16 X |
| 4,378,400 | 3/1983 | Makino et al. | 428/220 |
| 4,474,858 | 10/1984 | Makino et al. | 55/16 X |
| 4,657,564 | 4/1987 | Langsam | 55/16 |
| 4,690,873 | 9/1987 | Makino et al. | 55/158 X |
| 4,705,540 | 11/1987 | Hayes | 55/16 |
| 4,717,393 | 1/1988 | Hayes | 55/16 |
| 4,717,394 | 1/1988 | Hayes | 55/16 |
| 4,838,900 | 6/1989 | Hayes | 55/158 X |

FOREIGN PATENT DOCUMENTS

| 0219878 | 4/1987 | European Pat. Off. | 55/158 |
| 58-005344 | 1/1983 | Japan | 55/158 |
| 58-008512 | 1/1983 | Japan | 55/158 |
| 61-107908 | 5/1986 | Japan | 210/500.39 |

OTHER PUBLICATIONS

Kim, et al, "Reverse Permselectivity of $N_2$ Over $CH_4$ in Aromatic Polyimides", J. Appl. Poly. Sci., vol. 34, (1987), pp. 1767–1771.

Primary Examiner—Robert Spitzer
Attorney, Agent, or Firm—Mark L. Rodgers; William F. Marsh; James C. Simmons

[57] ABSTRACT

The present invention is a class of polyimide membranes containing copolymerizable, surface modifiable units containing both aromatic diamines and alkenylated diamines having an allyl or allylaryl group preferably positoned ortho to an amine functionality. The polyimide membranes can be surface modified by treatment with an activating force such as high energy electromagnetic irradiation or with a free radical source to impart high selectivity to the membrane without causing a large decrease in composite permeance.

15 Claims, No Drawings

MEMBRANES FORMED FROM UNSATURATED POLYIMIDES

CROSS-REFERENCE TO RELATED APPLICATIONS

This application is a continuation-in-part of co-pending application Ser. No. 336,383, filed Apr. 11, 1989, now abondoned.

TECHNICAL FIELD

The present invention relates to polymeric membranes, and in particular to membranes formed from polyimides for gas separation applications.

BACKGROUND OF THE INVENTION

There is a need for improved polymeric materials that are highly permeable, yet may under certain circumstances, provide selective separation of various gas combinations. Such materials would especially be useful in commercial, non-cryogenic gas separation processes.

The commercial application for gas separation devices based on polymeric materials relies, in part, on maximizing the overall gas flux through the membrane. T. H. Kim, et al., J. Appl. Poly. Sci., 34 1767 (1987), reported that the gas flux for a membrane is relatable to the average space between the polymer chains. In addition, they indicated that the density of the polymer is also related to the overall gas flux. The problem, in part, for these commercial applications is to identify polymers with very high flux and with good thermomechanical properties. It has generally been observed that to achieve high overall flux requires having a polymer with low chain-chain interactions. This can be exemplified by polymers such as poly(dimethylsiloxane) or poly(4-methyl-1-pentene). These materials have rather high gas flux values. These high flux materials have, because of their low chain-chain interaction, low glass transition temperatures (Tg). As a consequence, these materials require either special processing conditions to build in chemical and physiochemical crosslinking or they can be used only at rather low application temperatures. By contrast, polymers with strong chain-chain interactions have rather high Tg values and have usually exhibited rather low gas flux.

Polyimides, which generally have strong chain-chain interactions and have high Tg values, have been reported to have good gas flux values for certain specific structures. Specifically, U.S. Pat. Nos. 3,822,202 (1974); Re. 30,351 (1980) discloses a process for separating fluids using a semipermeable membrane made from polyimides, polyesters or polyamides. The repeating units of the main polymer chain of these membranes are distinguished in that such repeating units have at least one rigid divalent sub-unit, the two main chain single bonds extending from which are not colinear, is sterically unable to rotate 360° around at least one of these bonds, and has 50% or more of its main chain atoms as members of aromatic rings.

U.S. Pat. No. 4,705,540 discloses a highly permeable aromatic polyimide gas separation membrane and processes for using said membrane. The membrane is an aromatic polyimide membrane in which the phenylenediamines are rigid and are substituted on essentially all of the positions ortho to the amino substituents, and the acid anhydride groups are essentially all attached to rigid aromatic moieties.

U.S. Pat. Nos. 4,717,393 and 4,717,394 teach polymeric membranes and processes using the membranes for separating components of the gas mixture. The membranes disclosed in both of these patents are semi-flexible, aromatic polyimides, prepared by polycondensation of dianhydrides with phenylenediamines having alkyl substituents on all ortho positions to the amine functions, or with mixtures of other, non-alkylated diamines, some components have substituents on all positions ortho to the amine functions. It is taught that the membranes formed from this class of polyimides exhibit improved environmental stability and gas permeability, due to the optimization of the molecular free volume in the polymer. It is also taught that such membranes can be photochemically crosslinked, which in some instances results in a better performing membrane.

U.S. Pat. No. 4,378,400 discloses gas separation membranes formed from aromatic polyimides based upon biphenyltetracarboxylic dianhydride for separating various gas mixtures.

Additionally, attempts have been made to synthesize membranes having high flux and high selectivity by creating a composite structure on the polymeric membrane surface by means of a chemical reaction between a labile function in the polymer and some "activating force". Such methods are taught in U.S. Pat. No. 4,657,564 wherein poly(1-trimethylsilylpropyne) is treated with a dilute fluorine gas stream and in U.S. Pat. No. 4,717,393 wherein a polyimide containing a benzophenone-containing linking group is irradiated with a medium pressure mercury lamp.

BRIEF SUMMARY OF THE INVENTION

The present invention is an improved class of membranes formed from polyimides containing copolymerizable, surface modifiable units containing both aromatic diamines and alkenylated diamines having an allyl or allylaryl group. In a preferred embodiment, the allyl or allylaryl group is positioned ortho to an amine functionality. The polyimides making up the membrane can be surface modified by treatment with an activating force such as high energy electromagnetic irradiation or a free radical source, to form a thin film or crosslinked polymer at the membrane surface. The thin film of surface modified polymer provides enhanced selectivity for various gas separation applications, especially $O_2/N_2$ separation, without resulting in a large decrease in the flux of the permeate gas through the membrane.

DETAILED DESCRIPTION OF THE INVENTION

The present invention is a class of membranes formed from polyimides containing copolymerizable, surface modifiable units containing both aromatic diamines and also alkenylated diamines having an allyl or allylaryl group. The polyimides from which the membranes are formed have the general structural formula:

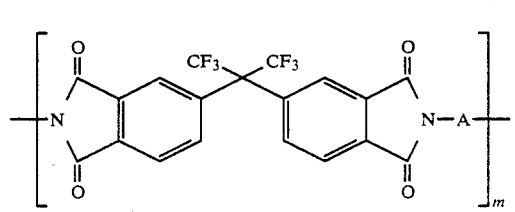

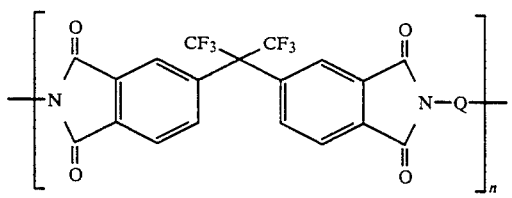

where

N—A—N is any aromatic diamine which is capable of forming a polyimide;

Q is an alkenylated phenylene or diphenylene having the general structural formulas:

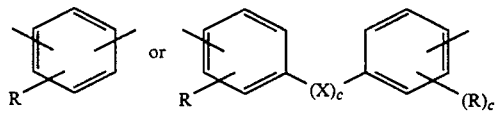

wherein each R is independently an allyl or allylaryl group; X is methylene, alkylene, or $C_1$-$C_6$ branched alkylene group, oxygen, sulfur, sulfonyl, carbonyl or fluoroalkylene, each c is independently 0 or 1 and m and n are integers such that the ratio of m:n is from 0.1 to 99.

More specifically, when R is an allyl group it can be represented by the general structural formula:

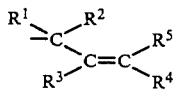

wherein $R^1$, $R^2$, $R^3$, $R^4$ and $R^5$ are hydrogen, $C_{1-3}$ aliphatic, phenyl, halogen or alkoxy radicals, or $R^2$ and $R^4$ or $R^5$ are bridged via an alkylene radical —$(CH_2)_y$— wherein y=2 to 5.

In embodiments in which R is an allylaryl group, it can be represented by the general structural formula:

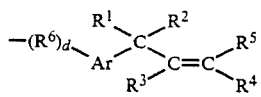

wherein $R^6$ is —$CH_2$—; Ar is phenylene or substituted phenylene, d=0 or 1 and $R^1$, $R^2$, $R^3$, $R^4$ and $R^5$ are as described above.

The moiety represented by Q is incorporated into the overall polyimide by reacting; i.e. adding, the moiety to a dianhydride, consequently, the majority of Q moieties present in the polymer structure will be bonded to a second amine nitrogen.

It has now been found that Q moieties having the structures set out above can be polymerized into the imide chain and will respond to simple crosslinking reactions. It is the presence of the unsaturated hydrocarbon radical; i.e., the allyl or allylaryl group which acts as a surface modifier and allows for chemical or radiation surface modification. Consequently various other substituents may be present on the phenylene or diphenylene structure as long as one substituent is an R group as described above. Surface modification is carried out by exposing the polymer to any suitable activating force, such as high energy electromagnetic irradiation, such as longwave and shortwave UV irradiation and x-ray irradiation with and without photo sensitizers. Alternatively, the activating force may be a free radical source which is contacted with the surface of the polymer, which include volatile peresters, peroxides and azo compounds followed by thermal activation with or without metal accelerators.

The surface modification processes create a composite polymer film wherein the bulk of the material, with a combination of high flux and low selectivity, provide mechanical support for an insitu crosslinked surface layer which imparts high selectivity without causing a drastic reduction in the composite permeance. The thus formed polymer films can be used as membranes in any desired configuration such as flat sheets or hollow fibers, and are suitable for a wide variety of gas separation and pervaporation applications, especially $O_2/N_2$ separation.

The membranes of the present invention may be formed from polyimides having only the above structural units, or may be copolymerized with other polyimide structures. Preferred polyimide structural units which may be copolymerized with units of the above formula can be generally represented by the formula:

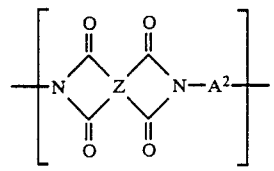

where $A^2$ is any aromatic diamine and

Z is

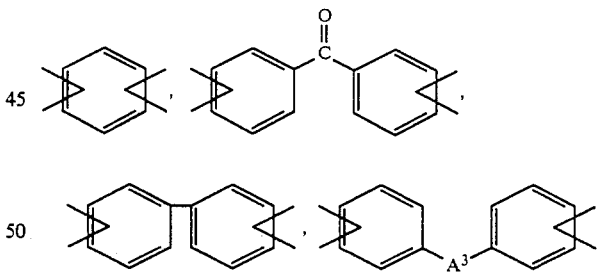

wherein $A^3$ is $C(CH_3)_2$, O, S or $SO_2$.

In addition to the above polyimide structures, minor amounts of other monomer units may be present which do not affect the gas separation properties of the resultant membrane.

The alkylation chemistry developed by Air Products and Chemicals, Inc. as described in U.S. Pat. No. 4,714,778 and EPO publication No. 277596 can be used to prepare a wide variety of aromatic diamines where an unsaturated hydrocarbon radical is positioned ortho to an amine function. A number of preferred materials which can be made by these methods and subsequently incorporated into a polyimide structure include:

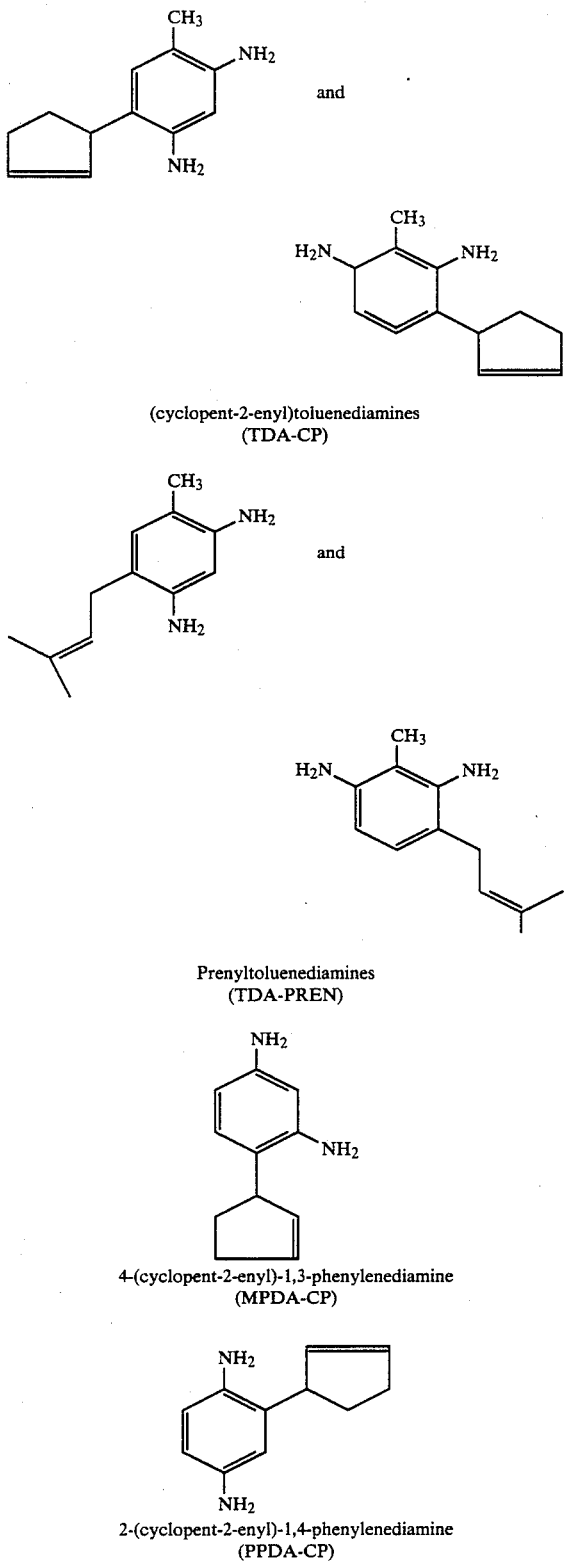

(cyclopent-2-enyl)toluenediamines
(TDA-CP)

Prenyltoluenediamines
(TDA-PREN)

4-(cyclopent-2-enyl)-1,3-phenylenediamine
(MPDA-CP)

2-(cyclopent-2-enyl)-1,4-phenylenediamine
(PPDA-CP)

The common feature of aromatic diamines used in this invention is the presence of allylic hydrogens. The number and placement of active hydrogens varies according to which diamine is used, as well as the instance of conjugation verse nonconjugation with the aromatic ring. It is the presence of these "ene" substituents which offer the possibility for chemical or radiation induced surface modification.

The "ene"-containing diamines are polymerized with other desired diamines and dianhydrides in a tertiary mixture under general polymerization conditions suitable for polyimide formation. The resultant polyimide is subsequently cast into membrane form, such as a flat sheet or hollow fiber. Surface modification, as described above, may be carried out on the polymer prior to or after it is cast into a membrane, although it is preferred to surface modify in the final form of dried polymer membrane.

The polyimide membranes of the present invention are useful in gas separation applications, especially for the recovery of oxygen from an $O_2/N_2$ stream or from air. The gas mixture to be separated is simply brought into contact with the membrane, whereby one or more components is selectively permeated through the membrane. The surface modified membranes exhibit enhanced selectivity without a drastic reduction in flux.

The following examples are presented to better illustrate the present invention and are not meant to be limiting.

EXPERIMENTAL PROCEDURE

Preparation of Polyimides by Condensing 6F-Dianhydride with Aromatic Diamines

General Procedure:

The following procedures were used to prepare polyimides by condensing 5,5'-[2,2,2-trifluoro-1-(trifluoromethyl)ethylidine]bis-1,3-isobenzofuranedione (6F-dianhydride) with the aromatic diamine mixtures indicated in Tables 1, 3, 4, 5, 6 and 7. Variations in polymerization reaction parameters between the different aromatic diamine mixtures reflect the specific conditions required to obtain good, film-forming polyimides.

Polyamic Acid Preparation:

A 20.000 g (0.04502 mol) portion of 6F-dianhydride is added proportionately through the course of 0.5 hr. to a solution of 0.004502 mols of the aromatic diamine mixture in anhydrous N,N-dimethyl acetamide (DMAC). During the addition, the mixture is being stirred mechanically under an inert nitrogen blanket. The initial reaction temperature for a given aromatic diamine mixture is indicated in the Tables below. The amount of DMAC used is determined by the percent solids concentration also indicated in the Tables below. Approximately one hour after the addition of dianhydride, the reaction temperature is brought to 25° C. and the reaction mixture is stirred for the indicated reaction time. This polyamic acid solution is used directly in preparing the corresponding polyimide solution.

Polyimide Preparation:

The solids concentration of the polyamic acid solution was adjusted with DMAC values indicated in the Tables below. Acetic anhydride (9.18 g, 0.0900 mol) and 2.27 g (0.0225 mol) of triethylamine were added to the polyamic acid solution. The solution was then heated to 60° C. for 3 hours with stirring. After cooling, the polyimide solution was cast on glass plates. Polyimide films of ca. 100 micron thickness were obtained after vacuum drying at 70° C./200 mm Hg for 8 hours, then 100° C./0.5 mmHg for 16 hrs. followed by 225° C. at 0.2 mmHg for 8 hours. The polyimide films were removed from the glass and in some cases dried under more rigorous conditions as indicated in the Tables below. In all cases the films were capable of withstanding a 150 psig pressure differential in a gas permeability test cell.

EXAMPLES 1-5

Several polyimide membranes were synthesized wherein TDA-CP was added to the polymer structure as a surface modifier. Durenediamine (DDA) was used as the second diamine (base diamine) incorporated into the polyimide structure and was also used for the "control" polyimide. The DDA/TDA-CP copolyimides were prepared with varying levels of TDA-CP (based on the diamine component). Dense films formed from the polymers were dried to 100° C./0.1 mm/17 h. The physical properties of various DDA/TDA-CP copolyimides along with the DDA control were measured and are reported in Table 1 below. The d-spacing was determined by wide angle X-ray scatter techniques (WAXS). It has been taught that the parameters of d-spacing can be used to characterize polyimide films in that as oxygen permeability increases, the corresponding measurement of d-spacing also generally increases. W. J. Koros, et al., J. Memb. Sci., 37, 45 (1988).

TABLE 1

Physical Properties of DDA + TDA-CP Based Polyimides

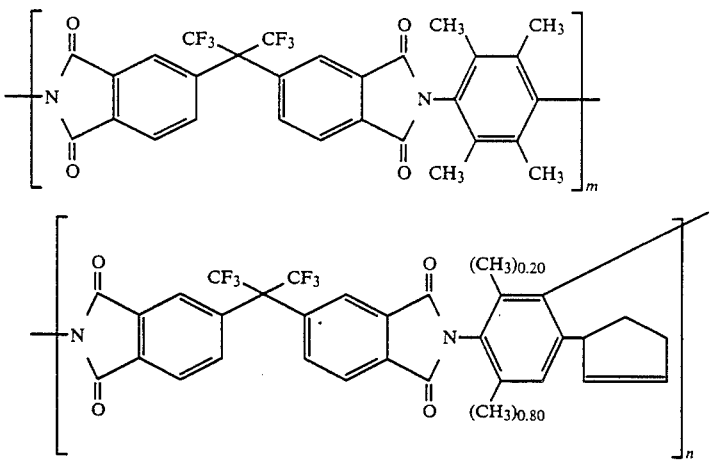

| Example No. | 1 | 2 | 3 | 4 | 5 |
|---|---|---|---|---|---|
| m | 1.0 | 0.95 | 0.90 | 0.80 | 0.50 |
| n | 0.00 | 0.05 | 0.10 | 0.20 | 0.50 |
| $\eta j^1$ | 1.00 | .830 | .424 | .672 | .487 |
| $P(O_2)^2$ | 96.9 | 106.8 | 68.3 | 54.9 | 41.2 |
| $\alpha(O_2/N_2)$ | 3.00 | 3.10 | 3.13 | 3.22 | 3.41 |
| $d (\text{Å})^3$ | 5.94 | 5.93 | 5.76 | 5.74 | 5.65 |

Initial Polyamic Acid Reaction Temp = 0° C.
Polyamic Acid Reaction Time = 17 h
% Solids during Polyamic Acid Formation = 25%
% Solids during Polyimide Formation = 15%
[1]DMAC - 25° C.
[2]P = Barrers
[3]WAXS technique The results of Table 1 indicate a general trend of decreasing $P(O_2)$ values and increasing $\alpha$ $O_2/N_2$ as the TDA-CP content of the polymer increases.

EXAMPLES 6-14

Several of the polyimide membranes described in Table 1 were treated with UV irradiation for varying time periods. The membranes treated were formed from DDA-TDA/CP copolyimides containing 5%, 10%, or 20% TDA-CP. The treated membranes, along with untreated (control) membranes were tested for oxygen permeance and $O_2/N_2$ selectivity. The results of these tests, along with treatment times are set out in the following Table 2.

TABLE 2

Effect of UV Irradiation on DDA-TDA-CP Copolyimide

| | Control - 5% TDA-CP (Example 2: m = 0.95, n = 0.05) P(O2) = 106.8 P(N2) = 34.5 a = 3.10 5% TDA-CP | | | | | Control - 10% TDA-CP (Example 3: m = 0.90, n = 0.10) P(O2) = 63.8 P(N2) = 21.9 a = 3.12 10% TDA-CP | | Control - 20% TDA-CP (Example 4: m = 0.80, n = 0.20) P(O2) = 54.9 P(N2) = 17.1 a = 3.2 20% TDA-CP | |
|---|---|---|---|---|---|---|---|---|---|
| Example No. | 6 | 7 | 8 | 9 | 10 | 11 | 12 | 13 | 14 |
| Treatment Time (minutes) | 5 | 10 | 15 | 90 | 90 | 15 | 90 | 15 | 90 |
| # Sides Treated | 1 | 1 | 1 | 1 | 2 | 1 | 2 | 1 | 1 |
| Thickness[1] | 50 | 76 | 57 | 44 | 57 | 57 | 85 | 121 | 74 |
| $P(O_2)^2$ | 85.1 | 62.0 | 27.9 | 5.58 | 3.59 | 15.0 | 2.16 | 19.1 | 2.1 |
| $P/P(O_2)^3$ | .838 | .194 | .0663 | .0134 | .00652 | .0336 | .00263 | .00242 | .000297 |
| $P(N_2)^2$ | 23.3 | 12.9 | 3.68 | .656 | .371 | 2.89 | .250 | 3.41 | .363 |

TABLE 2-continued

Effect of UV Irradiation on DDA-TDA-CP Copolyimide

| | Control - 5% TDA-CP (Example 2: m = 0.95, n = 0.05) $P(O_2) = 106.8$ $P(N_2) = 34.5$ a = 3.10 5% TDA-CP | | | | | Control - 10% TDA-CP (Example 3: m = 0.90, n = 0.10) $P(O_2) = 63.8$ $P(N_2) = 21.9$ a = 3.12 10% TDA-CP | | Control - 20% TDA-CP (Example 4: m = 0.80, n = 0.20) $P(O_2) = 54.9$ $P(N_2) = 17.1$ a = 3.2 20% TDA-CP | |
|---|---|---|---|---|---|---|---|---|---|
| Example No. | 6 | 7 | 8 | 9 | 10 | 11 | 12 | 13 | 14 |
| P/P(N$_2$)[3] | .144 | .0271 | .00723 | .00151 | .000658 | .00584 | .000298 | .000352 | .000050 |
| a(P)[4] | 3.65 | 4.80 | 7.58 | 8.51 | 9.67 | 5.16 | 8.64 | 5.6 | 5.8 |
| a(P/P)[5] | 5.82 | 7.16 | 9.17 | 8.87 | 9.91 | 5.75 | 8.82 | 6.9 | 5.9 |

[1]Thickness - in cm × 10$^{+4}$
[2]P in barrers
[3]P/P in barrers/cm × 10$^{+5}$
[4]Selectivity on composite film
[5]Selectivity on series resistance model The results reported in Table 2 indicate that oxygen permeance tends to decrease as UV treatment time increases whereas selectivity tends to improve. Accordingly, optimum treatment time can be tailored to achieve the desired levels of permeance and selectivity for a given application. Additionally, it can be seen that both $P(O_2)$ and $P/l(O_2)$ decrease rapidly as the TDA-CP level in the polyimide increases, indicating that low levels of surface modifying groups are generally preferred.

EXAMPLES 15-18

Several DDA/TDA-CP copolyimide membranes were treated with U.V. irradiation for varying periods of time. Prior to treatment, the membranes were dried to 225° C./0.1 mm/6 h. The copolyimides contained 2.5 mole % TDA-CP with the other; i.e. "base" diamine, being DDA. The treated membranes, along with an untreated control membrane, were tested for oxygen permeance and $O_2/N_2$ selectivity. The results of the tests, along with the treatment conditions, are set out in Table 3 below.

TABLE 3

Effects of UV Irradiation DDA + TDA-CP

| Example | 15 | 16 | 17 | 18 |
|---|---|---|---|---|
| UV (Time) Min | 0 | 15 | 10 | 7.5 |
| Thickness[1] | — | 97 | 91 | 105 |
| P(O$_2$)[2] | 179 | 66.5 | 129.7 | 102.2 |
| P/l(O$_2$)[3] | — | .109 | .517 | .248 |
| P(N$_2$)[2] | 53.7 | 9.98 | 28.8 | 32.2 |
| P/l(N$_2$)[3] | — | .0126 | .0682 | .0365 |
| α(P)[4] | 3.33 | 6.66 | 4.50 | 4.82 |
| α (P/l)[5] | — | 8.65 | 7.58 | 6.79 |

Initial Polyamic Acid Reaction Temp = 0° C.
Polyamic Acid Reaction Time = 17 h
% Solids during Polyamic Acid Formation = 30%
% Solids during Polyimide Formation = 20%
[1]Thickness - in cm × 10$^{+4}$
[2]P in barrers
[3]P/l in barrers/cm × 10$^{+5}$
[4]Selectivity on composite film
[5]Selectivity on series resistance model The results reported in Table 3 above show that, at TDA-CP levels of 2.5 mole %, increasing the irradiation time from 7.5 to 15 minutes decreased both the P and P/l for oxygen. Selectivity, however, increased with a corresponding increase in treatment time.

EXAMPLES 19-26

Several DDA/TDA-CP polyimides, containing 5.0 mole % TDA-CP were dried, treated and tested as set out in Table 3 above. The results of the tests, along with the treatment conditions, are set out in Table 4 below.

EXAMPLES 27-30

Several polyimide membranes were synthesized containing 5 mole % TDA-CP as a crosslinker and 9,9-bis(4-amino-3-isopropyl-5-methylphenyl)fluorene as the base diamine in the polymer structure. The polymers were dried to 225° C./0.1 mm/6 h and surface modified by treatment with UV-irradiation. The treated membranes, along with a control (untreated) membrane, were tested for $O_2$ and $N_2$ permeability and selectivity. U.V. treatment times and the results of the tests are set out in Table 5 below.

TABLE 4
Effects of UV Irradiation
DDA + TDA-CP

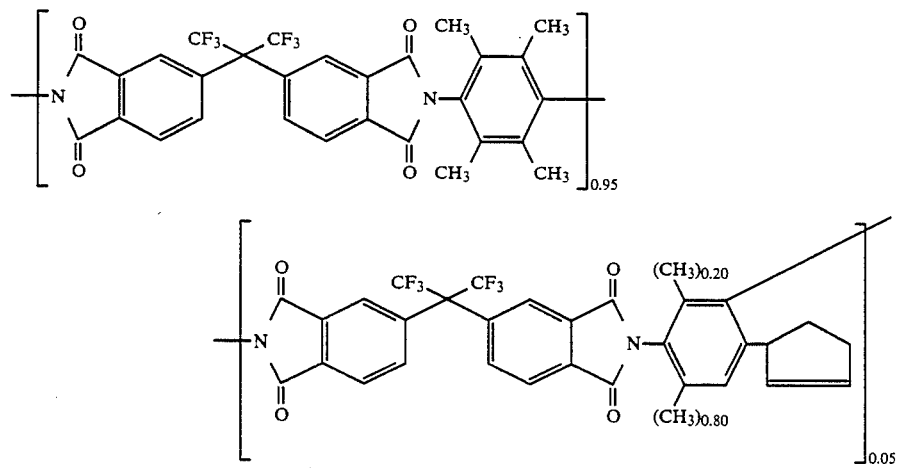

| Example | 19 | 20 | 21 | 22 | 23 | 24 | 25 | 26 |
|---|---|---|---|---|---|---|---|---|
| UV (Time) Min | 0 | 45 | 30 | 15 | 10 | 10 | 10 | 10 |
| Thickness[1] | — | 114 | 113 | 110 | 120 | 72 | 86 | 72 |
| P(O$_2$)[2] | 138.4 | 28.08 | 65.16 | 91.2 | 90.57 | 37.33 | 41.59 | 39.03 |
| P/l(O$_2$)[3] | — | .0309 | .109 | .243 | .218 | .0916 | .0936 | .0992 |
| P(N$_2$)[2] | 43.0 | 3.85 | 8.81 | 17.0 | 20.0 | 6.23 | 6.13 | 5.42 |
| P/l(N$_2$)[3] | — | .00366 | .00780 | .0256 | .0312 | .0127 | .0108 | .0104 |
| α(P)[4] | 3.22 | 7.63 | 7.39 | 5.37 | 4.54 | 5.99 | 6.78 | 7.20 |
| α (P/l)[5] | — | 8.44 | 12.8 | 9.49 | 7.00 | 7.21 | 9.00 | 9.54 |

Initial Polyamic Acid Reaction Temp = −5° C.
Polyamic Acid Reaction Time = 17 h
% Solids during Polyamic Acid Formation = 25%
% Solids during Polyimide Formation = 20%
Drying Conditions for these films:
100° C./.2 mmHg 16 hrs.
225° C./.2 mmHg 8 hrs.
[1]Thickness - in cm × 10$^{+4}$
[2]P in barrers
[3]P/l in barrers/cm × 10$^{-5}$
[4]Selectivity on composite film
[5]Selectivity on series resistance model The results in Table 4 above show good selectivity for all level of irradiation time with a slight decrease occurring at 10 min.

TABLE 5
Effects of UV Irradiation
2Me2iPrF + TDA-CP[4]

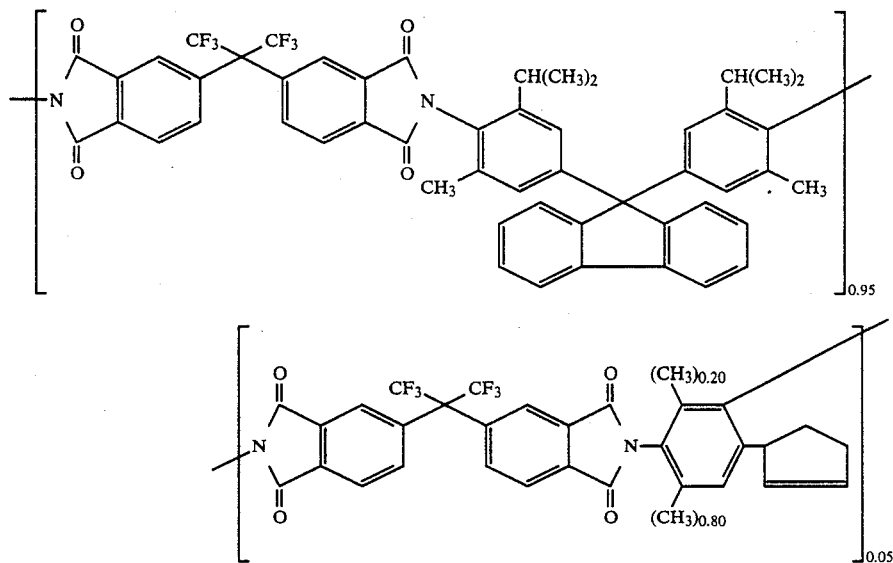

| Example | 27 | 28 | 29 | 30 |
|---|---|---|---|---|
| UV (Time) Min | 0 | 15 | 10 | 7.5 |
| Thickness[1] | — | 117 | 141 | 116 |
| P(O$_2$)[2] | 88.1 | 64.0 | 82.1 | 75.2 |
| P/l(O$_2$)[3] | — | .20 | .81 | .441 |
| P(N$_2$)[2] | 21.1 | 13.0 | 17.9 | 17.5 |
| P/l(N$_2$)[3] | — | .028 | .083 | .088 |
| α(P)[4] | 4.2 | 4.9 | 4.6 | 4.3 |
| α(P/l)[5] | — | 7.1 | 9.8 | 5.0 |

Initial Polyamic Acid Reaction temp = 20° C.
Polyamic Acid Reaction Time = 17 h
% Solids during Polyamic Acid Formation = 20%
% Solids during Polyimide Formation = 15%
Drying Conditions for these films:
100° C./.2 mmHg 16 hrs.
225° C./.2 mmHg 8 hrs.
[1]Thickness - in cm × 10$^{+4}$
[2]P in barrers
[3]P/l in barrers/cm × 10$^{+5}$
[4]Selectivity on composite film
[5]Selectivity on series resistance model The results reported in Table 5 above indicate that a variety of base diamines are effective for UV activated crosslinking. The general trends observed for the DDA/TDA-CP polyimides, i.e. decrease in P(O$_2$) with increasing irradiation time from 7 ½ to 15 minutes, was also observed for these polyimides.

EXAMPLES 31-34

Polyimide membranes were synthesized which contained MPDA-CP as the surface modifying agent. The crosslinking material was copolymerized at 5 mole % on diamine content with DDA and 6F-dianhydride to the structure illustrated below. A membrane was irradiated as shown and tested for oxygen and nitrogen transport properties as set out in Table 6 below:

TABLE 6

UV Irradiation of MPDA-CP

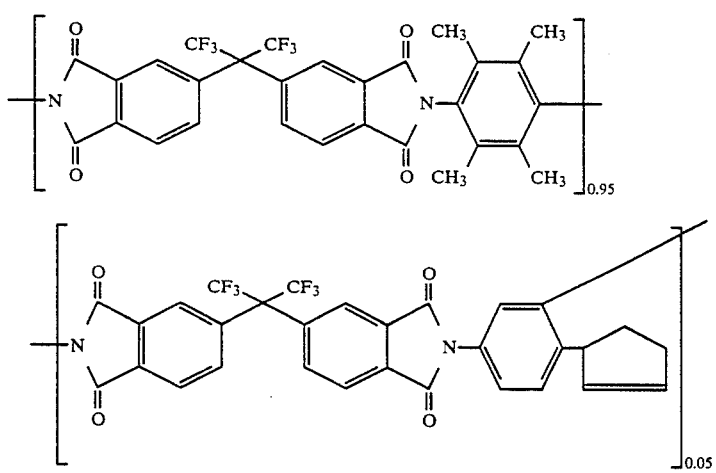

| Example | 31 | 32 | 33 | 34 |
|---|---|---|---|---|
| UV (Time) Min | 0 | 15 | 30 | 45 |
| Thickness[1] | 101 | 112 | 100 | 92 |
| $P(N_2)$[2] | 55.8 | 17.4 | 6.7 | 5.3 |
| $P/l(N_2)$[3] | — | .0226 | .00761 | .0053 |
| $P(O_2)$[2] | 185.2 | 103.0 | 5.15 | 45.0 |
| $P/l(O_2)$[3] | — | .210 | .0713 | .0646 |
| $\alpha(P)$[4] | 3.32 | 5.95 | 7.69 | 8.49 |
| $\alpha(P/l)$[5] | — | 9.29 | 9.37 | 12.2 |

Initial Polyamic Acid Reaction Temp = 10° C.
Polyamic Acid Reaction Time = 17 h
% Solids during Polyamic Acid Formation = 25%
% Solids during Polyimide Formation = 15%
Drying Conditions for these samples:
100° C./.2 mmHg 16 hrs.
225° C./.2 mmHg 8 hrs.
[1]Thickness - in cm × $10^{+4}$
[2]P in barrers
[3]P/l in barrers/cm × $10^{-5}$
[4]Selectivity on composite film
[5]Selectivity on series resistance model

EXAMPLES 35-38 (COMPARATIVE)

The above examples demonstrate the effectiveness of a variety of ortho-ene aromatic diamines in a polyimide structure for UV sensitized surface modifying. An alternative approach which has been reported is using benzophenone dianhydride (BzPDA). The U.V. activated surface modifying process with BzPDA relies upon an activation of the aromatic carbonyl structure to form a crosslinked structure. In order to compare the relative properties of a BzPDA system to that of ortho-ene based systems, BzPDA polymer membranes were synthesized and treated with UV irradiation under the same general conditions as the ortho-ene systems in the previous samples. The treated BzPDA systems, along with a control, were tested for oxygen and nitrogen permeance and selectivity and the results are reported in Table 7 below.

TABLE 7
Effects of UV Irradiation on Benzophenone Dianhydride Polyimides

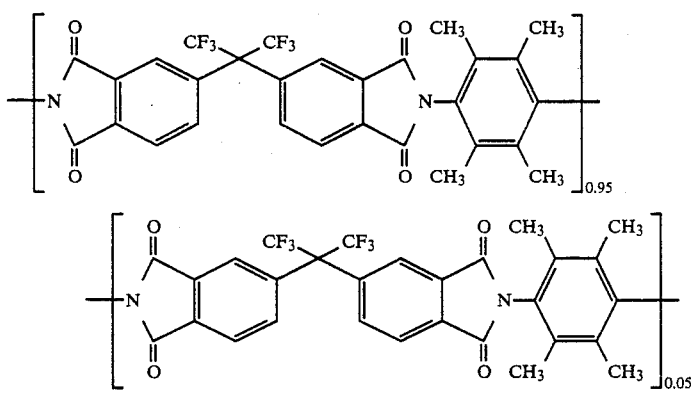

| EXAMPLE | 35 | 36 | 37 | 38 |
|---|---|---|---|---|
| UV (Time) Min | 0 | 15 | 10 | 7.5 |
| Thickness[1] | — | 102 | 136 | 105 |
| P(O$_2$)[2] | 148.9 | 86.7 | 93.3 | 97.9 |
| P/l(O$_2$)[3] | — | .203 | .184 | .272 |
| P(N$_2$)[2] | 45.2 | 15.9 | 23.1 | 30.3 |
| P/l(N$_2$)[3] | — | .240 | .0347 | .0875 |
| α(P)[4] | 3.29 | 5.45 | 4.04 | 3.23 |
| α (P/l)[5] | — | 8.46 | 5.30 | 3.11 |

Initial Polyamic Acid Reaction Temp = 0° C.
Polyamic Acid Reaction Time = 17 h
% Solids during Polyamic Acid Formation = 20%
% Solids during Polyimide Formation = 15%
Drying Conditions for film:
100° C./.2 mmHg 16 hrs.
225° C./.2 mmHg 8 hrs.
[1]Thickness - in cm × 10$^{+4}$
[2]P in barrers
[3]P/l in barrers/cm × 10$^{+5}$
[4]Selectivity on composite film
[5]Selectivity on series resistance model The results reported above for the BzPDA systems show that, unlike the ortho-ene systems of the present invention, P/l (O$_2$) is rather flat over the range of irradiation times, and O$_2$/N$_2$ selectivity remains generally poor, with UV treatment having a much less dramatic effect.

What is claimed is:

1. A semi-permeable membrane formed of a polyimide containing copolymerizable, surface modifiable units of the formula:

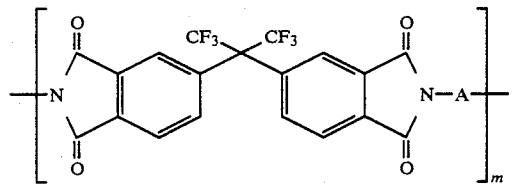

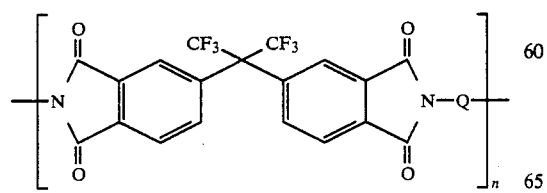

where
N—A—N is an aromatic diamine;
Q is an alkenylated phenylene or diphenylene containing an allyl or allylaryl group; and
m and n are integers such that the ratio of m:n is from 0.1 to 99.

2. A membrane in accordance with claim 1 which has been contacted with a source of high energy electromagnetic irradiation to effect surface modification among the co-polymerizable, surface modifiable units.

3. A membrane in accordance with claim 2 wherein said source of high energy electromagnetic irradiation is selected from the group consisting of longwave UV irradiation, shortwave UV irradiation and X-ray irradiation with and without photo sensitizers.

4. A membrane in accordance with claim 1 which has been contacted with a free radical source.

5. A membrane in accordance with claim 4 which has been contacted with a free radical source selected from the group consisting of volatile peresters, peroxides and azo compounds followed by thermal activation with or without metal accelerators.

6. A membrane in accordance with claim 1 wherein Q is an alkenylated phenylene having the general structural formula:

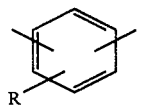

wherein each R is independently an allyl or allylaryl group.

7. A membrane in accordance with claim 6 wherein R is an allyl group having the general structural formula:

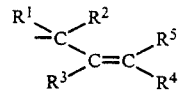

wherein $R^1$, $R^2$, $R^3$, $R^4$, and $R^5$, are hydrogen $C_1$–$C_3$ aliphatic, phenyl, halogen or alkoxy radicals or $R^2$ and $R^4$ or $R^5$ are bridged via an alkylene radical —$(CH_2)_y$— wherein $Y=2$ to 5.

8. A membrane in accordance with claim 6 wherein R is an allylaryl group having the general structural formula:

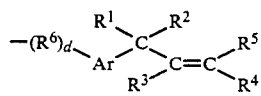

wherein $R^6$ is —$CH_2$—, Ar is phenylene or substituted phenylene, $d=0$ or 1 and $R^1$, $R^2$, $R^3$, $R^4$ and $R^5$ are hydrogen, $C_1$–$C_3$ aliphatic, phenyl, halogen or alkoxy radicals or $R^2$ and $R^4$ or $R^5$ are bridged via an alkylene radical —$(CH_2)_y$— wherein $y=2$ to 5.

9. A membrane in accordance with claim 1 wherein Q is an alkenylated diphenylene having the general structural formula:

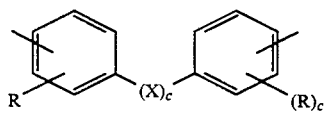

wherein each R is independently an allyl or allylaryl group; X is methylene, alkylene or $C_1$–$C_6$ branched alkylene group, oxygen, sulfur, sulfonyl, carbonyl, or fluoroalkylene and each c is independently 0 or 1.

10. A membrane in accordance with claim 9 wherein each R is an allyl group.

11. A membrane in accordance with claim 9 wherein R is an allylaryl group.

12. A membrane in accordance with claim 1 wherein Q has the structural formula:

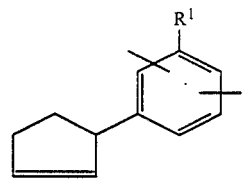

wherein $R^1$ is H or $CH_3$.

13. A membrane in accordance with claim 1 wherein Q has the structural formula:

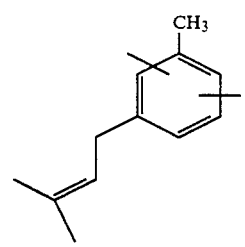

14. A membrane in accordance with claim 1 wherein said polyimide also contains third polymerizable units of the formula:

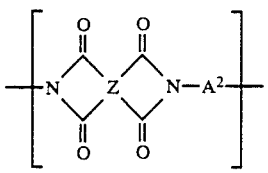

wherein
N—A—N is an aromatic diamine; and
Z is

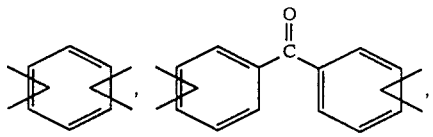

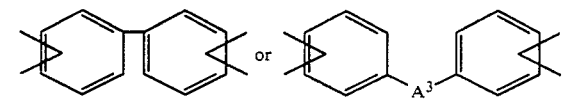

wherein
$A^3$ is $C(CH_3)_2$, O, S or $SO_2$.

15. A membrane in accordance with claim 14 wherein said third polymerizable units make up to 95% of the total polymerizable units of the polyimide.

* * * * *